Oct. 28, 1958 W. A. LOBDELL 2,857,893
INDUCTION SYSTEM
Filed June 10, 1957

INVENTOR.
Wallace A. Lobdell
BY
L.D. Burch
ATTORNEY.

United States Patent Office 2,857,893
Patented Oct. 28, 1958

2,857,893

INDUCTION SYSTEM

Wallace A. Lobdell, Taylor Center, Mich., assignor to General Motors Corporation, Detroit, Mich., a corporation of Delaware Application June 10, 1957, Serial No. 664,729

3 Claims. (Cl. 123—52)

The present invention relates to charge forming means for an internal combustion engine and more particularly, to an induction system and intake manifold therefor that will insure a high volumetric efficiency in the charging of the engine cylinders.

To obtain the maximum performance and economy from an internal combustion engine of the multicylinder type, it is essential that the engine have a high volumetric efficiency. In other words, each of the cylinders must receive identical charges having a maximum volume. In order to accomplish this objective numerous induction systems and intake manifolding have been devised. Although some of these manifolds have produced acceptable results, the various induction passages have presented resistances to the flow of the charges therethrough so as to materially limit the power developed by the engine. In addition, the individual resistances of the passages have not always been identical under all operating conditions and thus the charges delivered to the various cylinders have not necessarily been identical.

It is now proposed to provide an induction system for a multicylinder internal combustion engine having an intake manifold in which all of the various induction passages are substantially identical to each other. More particularly, this is to be accomplished by providing the intake manifold with a main body that forms an enlarged plenum chamber having an inlet adjacent the center thereof which is adapted to receive air from the atmosphere. A separate tube or ram pipe for each cylinder interconnects this plenum chamber with the various cylinders. All of these ram pipes are of substantially identical shapes so that all of the induction passages will be substantially identical. In addition, the dimensions of the ram pipes and intake passages in the cylinder heads are such that when the intake valves open and the charge is drawn into the cylinders, the columns of air in the passages will require sufficient momentum to ram the charge into the cylinders and thereby supercharge the cylinders.

More particularly, the intake manifold is especially adapted for use on a V-type engine and includes a plenum chamber formed by an arcuate cover and a flat horizontal floor and arranged to extend longitudinally of the engine between the banks of cylinders. The upper ends of the ram pipes intersect the flat floor at substantially right angles thereto. The pipes extend downwardly from the chamber and have a curve adjacent the upper end thereof so that the pipes may be crossed. This will permit the pipes to connect the cylinders on one side to the side of the chamber opposite thereto. The lower portions of the ram pipes are straight so that the curve adjacent the upper end will be remote from the intake passages in the cylinder heads. Thus if there is a curve in the intake passage, it will be remote from the curve in the ram pipe. Thus any points where changes in radial accelerations produced by the charge flowing around curves will be isolated and thus will not interfere with each other and destroy the ramming effect.

In the one sheet of drawings:

Figure 1 is a fragmentary end view of an engine employing an induction system embodying the present invention.

Figure 2:
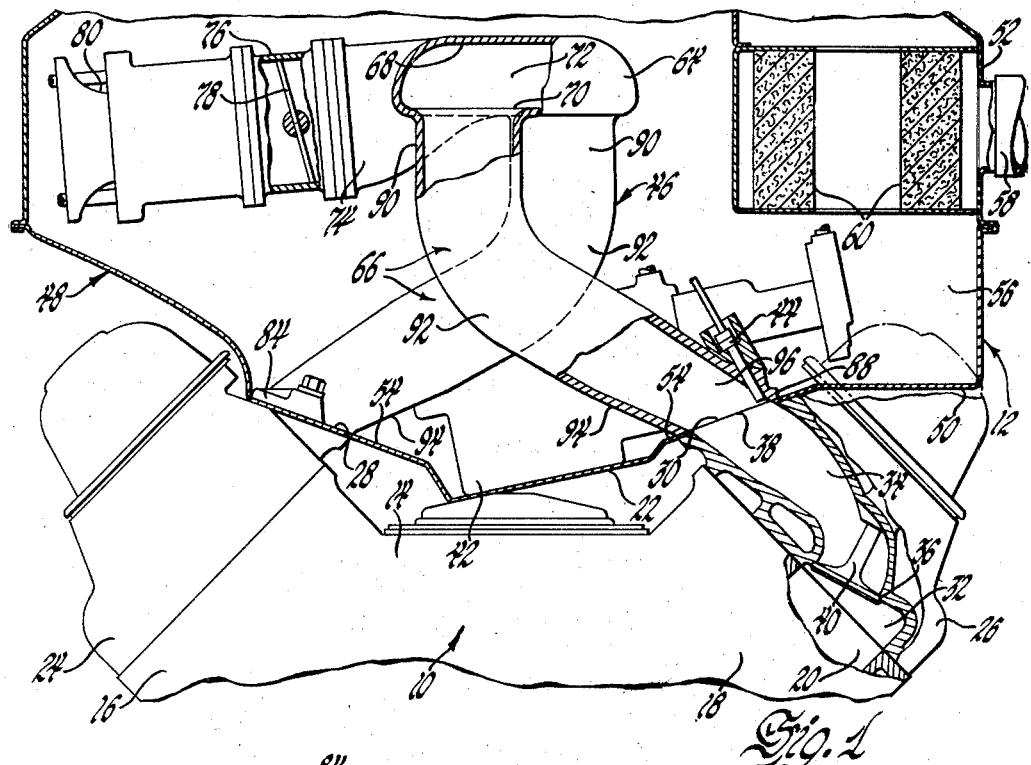
Figure 2 is a fragmentary plan view of the engine in Figure 1.

Referring to the drawing in more detail, this invention may be employed on an internal combustion engine 10 of any suitable design. However, in the present instance it is employed in an induction system 12 particularly adapted for use on an engine 10 of the so-called V-type. This engine 10 may include a cylinder block 14 having a pair of angularly disposed banks 16, 18 of cylinders 20 with an upwardly opening space 22 therebetween. A separate cylinder head 24, 26 is secured to each of these banks 16, 18 so that inclined faces 28, 30 on the inner sides thereof extend longitudinally along the opposite sides of the space 22. Each of the cylinder heads 24, 26 includes separate cavities 32 positioned to register with the open ends of the cylinders 20 to thereby form combustion chambers. Individual intake passages 34 for each of the cylinders 20 extend through the heads 24, 26 with the outer ends thereof forming rows of intake ports 38 in the faces 28, 30. The passages curve downwardly so that the inner ends thereof form valve seats 36 communicating with the combustion chambers. Intake valves 40 are disposed in each of these seats 36 and are actuated by the engine camshaft to time the flow of charges into the cylinders.

The supply of fuel for the charge of air is furnished by a fuel injection system having a metering control 42 responsive to the fuel demands of the engine 10 and effective to inject the metered fuel from the nozzles 44 and into the charge in proportion thereto.

The air induction system 12 includes an intake manifold 46 and a sheet metal housing 48 having a lower portion 50 and an upper portion 52. The bottom portion 50 is dished to fit over the camshaft gallery cover and receive the fuel metering control 42. A pair of flat portions 54 extend along each side of the bottom portion 50 so as to seat on the faces 28, 30 and support the housing 48. The upper portion 52 is secured to the lower portion 50 by any suitable means and thereby forms an enlarged chamber 56 having an atmospheric inlet 58 on one side thereof. This inlet 58 is adapted to receive the air from the atmosphere and includes a filter element 60 to permit clean, filtered air to circulate throughout the enlarged chamber 56.

The intake manifold 46 is disposed in the chamber 56 and includes a main body 64 and a plurality of ram pipes 66 that extend downwardly therefrom. The main body 64 is formed by an arcuate cover 68 and a flat substantially horizontal floor 70. The opposite ends of the body 64 are closed by end walls 71 that cooperate with the cover 68 and floor 70 to form an airtight plenum chamber 72.

An inlet duct 74 projects transversely from one side of the main body to form an inlet into the plenum chamber 72 for drawing the filtered air from the enlarged chamber 56. The outer end of this duct 74 includes a mounting flange adapted to have a throttle body 76 secured thereto. The throttle body 76 includes a throttle valve 78 effective to control the volume of air circulated through the induction system 12. If desired, an air meter or venturi 80 may be provided on the outer end of the throttle body 76 so that the air flowing therethrough will produce a vacuum signal adapted to actuate the fuel metering control 42. Thus the fuel will be metered in proportion to the volume of air flowing through the engine 10.

The floor 70 is substantially flat or planar and in a substantially horizontal position. The ram pipes 66 are all substantially identical to each other. The individual ram pipes 66 are designated 66A to 66H, inclusive, depending upon the cylinder which they charge and they may be broken down into two separate groups. One group includes ram pipes 66A, 66C, 66E, and 66G, while the other group includes ram pipes 66B, 66D, 66F, and 66H. The inlet ends of the ram pipes in the first group are secured to the floor 70 to form a row of aligned ports 82A, 82C, 82E, and 82G along one side of the plenum chamber 72. The outlet ends of the ram pipes are secured to a flat plate 84 on the side of the manifold opposite from the ports 82A, 82C, 82E, and 82G. This plate 84 is adapted to be secured to a face 28 so that the outlet ends of the ram pipes will register with the intake ports 38 and the ram pipes 66 and intake passages 34 will form one group of induction passages. The other group of ram pipes 66B, 66D, 66F, and 66H has the inlet ends thereof interconnected with the plenum chamber 72 to form a second row of ports 82B, 82D, 82F, and 82H extending down the second side of the plenum chamber 72. The outlet ends of these ram pipes are connected to a perforated plate 88 that is attached to the opposite face 30. Thus the ram pipes will communicate directly with the intake passages 34 to thereby form a second group of induction passages which are substantially identical to the first group.

It will be noted that the inlet ends of the ram pipes 66A to 66H, inclusive, intersect the floor 70 at substantially right angles to the plane thereof as this will improve the air flow through the ram pipes 66. Since this makes the upper ends 90 of the pipes 66 vertical, it is necessary to place a bend 92 in the ram pipe so that the lower end 94 will be inclined to correspond to the intake passage 34. This bend 92 is preferably located adjacent the upper end of the pipe 66 as this allows the lower portion 94 thereof to have a substantially straight section which is in exact alignment with the intake passage entrance.

It may thus be seen that even though the induction passage may have a reverse bend therein the curved portions are separated by a substantially straight section 96. Accordingly, after the air has flowed around the upper curve 92 and been subjected to radial acceleration, it will traverse a straight section 96 that will permit the effects of this acceleration to be dissipated before entering the lower curve. Thus even though the induction passages have reverse curves therein, the ramming effect can be maintained without inducing a prohibitive amount of turbulence that would otherwise destroy the ramming phenomena.

It is to be understood that, although the invention has been described with specific reference to a particular embodiment thereof, it is not to be so limited since changes and alterations therein may be made which are within the full intended scope of this invention as defined by the appended claims.

I claim:
1. An intake manifold for an internal combustion engine having a pair of angularly disposed banks of cylinders, said manifold comprising a plane horizontal floor and an arcuate cover secured thereto to form an elongated plenum chamber arranged to be disposed over the space between said banks and extend longitudinally of said engine, said cover having a substantially plane portion disposed parallel to said floor so that said plenum chamber will be relatively thin and wide, an inlet projecting transversely from said body for supplying air to the plenum chamber substantially normal to the axis thereof, a first set of ram pipes having the upper ends thereof disposed at right angles to said floor to form a row of aligned ports along one side of said chamber while the lower ends of said pipes are positioned to communicate with the cylinders in the bank on the opposite side of said engine, a second set of ram pipes having the upper ends thereof disposed at right angles to said floor to form another row of aligned ports extending along the opposite side of said chamber, the lower ends of said ram pipes in said second set being positioned to communicate with the cylinders in the other of said banks, each of said ram pipes being substantially identical and having a bend between the opposite ends thereof.

2. In an internal combustion engine having a pair of angularly disposed banks of cylinders with separate intake passages for each cylinder, an intake manifold comprising a plenum chamber having a substantially horizontal planar floor, a plurality of substantially identical ram pipes having the upper ends thereof intersecting said floor at substantially right angles thereto and having the lower ends thereof interconnected with said intake passages for said cylinders, each of said ram pipes and its associated intake passage forming an induction passage having reversely curved portions therein adjacent the opposite ends thereof and separated by a substantially straight portion.

3. In an internal combustion engine having a pair of angularly disposed banks of cylinders with separate intake passages for each cylinder, charge forming means including an intake manifold having an elongated plenum chamber with a substantially plane horizontal floor extending longitudinally of said engine over the space between said banks, an inlet projecting transversely from a side of said manifold for supplying induction air to said plenum chamber substantially normal to the axis thereof, a first set of ram pipes having the upper ends thereof intersecting said floor at substantially right angles to communicate with said plenum chamber and form a first row of ports along one side thereof while the lower ends thereof communicate with the intake passages for the cylinders in the bank on the opposite side of said engine, a second set of ram pipes having the upper ends thereof intersecting said floor at substantially right angles to communicate with said plenum chamber to form a second row of ports along the opposite side thereof while the lower ends thereof communicate with the intake passages for the cylinders in the other of said banks, said ram pipes and said intake passages forming induction passages having bends adjacent the opposite ends thereof separated by substantially straight center sections.

References Cited in the file of this patent
UNITED STATES PATENTS

| | | |
|---|---|---|
| 1,802,544 | Vincent | Apr. 28, 1931 |
| 1,977,200 | Osterberg | Oct. 16, 1934 |
| 2,119,879 | Hoffman et al. | June 7, 1938 |
| 2,382,244 | Lundquist et al. | Aug. 14, 1945 |
| 2,791,205 | Platner et al. | May 7, 1957 |

FOREIGN PATENTS

| | | |
|---|---|---|
| 518,518 | Great Britain | Feb. 29, 1940 |